(12) United States Patent
Karlapalem et al.

(10) Patent No.: US 12,761,032 B2
(45) Date of Patent: Oct. 13, 2026

(54) SYSTEM AND METHOD FOR GENERATING SCENIC ROUTES OVER SCENIC POINTS IN TWO-DIMENSIONAL (2D) SPACE

(71) Applicant: International Institute of Information Technology, Hyderabad, Hyderabad (IN)

(72) Inventors: Kamalakar Karlapalem, Hyderabad (IN); Lini Thomas, Hyderabad (IN); Loay Rashid, Hyderabad (IN)

(73) Assignee: INTERNATIONAL INSTITUTE OF INFORMATION TECHNOLOGY, HYDERABAD, Hyderabad (IN)

( * ) Notice: Subject to any disclaimer, the term of this patent is extended or adjusted under 35 U.S.C. 154(b) by 49 days.

(21) Appl. No.: 18/787,913

(22) Filed: Jul. 29, 2024

(65) Prior Publication Data

US 2026/0029240 A1 Jan. 29, 2026

(30) Foreign Application Priority Data

Jul. 29, 2024 (IN) ............................. 202341051134

(51) Int. Cl.
*G01C 21/34* (2006.01)
*G06T 11/26* (2026.01)

(52) U.S. Cl.
CPC .......... *G01C 21/3476* (2013.01); *G06T 11/26* (2026.01); *G06T 2210/21* (2013.01)

(58) Field of Classification Search
CPC .............. G01C 21/343; G01C 21/3476; G01C 21/3484; G01C 21/3461; G01C 21/3682; G01C 21/26; G01C 21/3667; G01C 21/3415
See application file for complete search history.

(56) References Cited

U.S. PATENT DOCUMENTS

2021/0172753 A1* 6/2021 Johnson, Jr. ......... G01C 21/343

* cited by examiner

*Primary Examiner* — Erin M Piateski
*Assistant Examiner* — John C Merino

(57) ABSTRACT

Embodiments herein provide a system for generating scenic routes with scenic views in a virtual 2D environment using route-generating methods. The system includes a scenic route-finding unit connected to an input data source through a network. The scenic route-finding unit comprises a processor that receives input data, including media content images with points of interest (POIs) and user preferences for the desired route length. It determines scenic points based on the coordinates of POIs, using a condition that each scenic point is equidistant from a randomly selected pair of POIs. The iterative selection continues until the desired route length is achieved. The processor generates scenic paths by forming lines and determining bisectors between POIs, creates a scenic graph by identifying intersection points and edges, and produces the scenic route by applying route-generating methods on the graph, enabling user navigation with corresponding scenic views.

20 Claims, 6 Drawing Sheets

300B

SYSTEM AND METHOD FOR GENERATING SCENIC ROUTES OVER SCENIC POINTS IN TWO-DIMENSIONAL (2D) SPACE

CROSS-REFERENCE TO RELATED APPLICATIONS

This patent application claims priority to Indian provisional patent application No. 202341051134 filed on Jul. 29, 2022, the complete disclosures of which, in their entirety, are hereby incorporated by reference.

FIELD OF THE INVENTION

The embodiments herein generally relate to route-finding methods, more particularly, a system and a method for generating scenic routes with scenic views corresponding to a virtual environment in a two-dimensional (2D) space using route-generating methods, enabling users to navigate the scenic routes with the scenic views corresponding to the virtual environment.

BACKGROUND

Humans have an implicit awareness of scenic beauty when traveling over various routes. The scenic beauty is defined within the context of a user and a set of viewpoints. Given a context, scenic beauty is defined to be a uniform and balanced view of points of interest. In order to transfer the scenic awareness, it is important to find scenic routes in 2-dimensional space.

Moreover, it is essential that the scenic routes should satisfy a set of route generating conditions including (i) only scenic: a route must consist of scenic paths and does not contain non-scenic (distracting) path, (ii) completeness: travelling on the route must allow one to have a view of a large number of first-second pairs or all first-second pairs, (iii) minimal edges: the route must not have a large number of edges and a large number of direction changes within the route, and (iv) minimal repeated edges: the route must contain a minimal number of repeated edges, where the repeated edges are defined as stretches of paths that must be travelled more than once (repeated) to complete the entire route.

In addition, it is also essential that the scenic routes should provide an equidistant view of points of interest in order to achieve balanced views of the points-of-interest.

Many scenic route-finding methods that apply graph traversals to generate scenic points and routes are available in the market. For example, a depth-first search/breadth first search traversals algorithm forces a user to traverse a given edge in a graph multiple time. Djikstra's algorithm provides a shortest route, however this algorithm does not ensure that a large number of first-second pairs are viewed upon a traversal of the route. Convex hull algorithm on the graph vertices combined with all-pair-shortest path algorithm provides the user with a closed route, however this algorithm does not ensure that a large number of first-second pairs are viewed upon a traversal of the route. Thus, these methods fail to provide balanced scenic views of the points-of-interest.

Therefore, there arises a need to address the aforementioned technical drawbacks in the existing methods in finding scenic routes in 2-dimensional space with scenic beauty being an equidistant view of points of interest.

SUMMARY

In view of the foregoing, an embodiment herein provides a processor-implemented method for generating scenic routes with scenic views corresponding to a virtual environment in a two-dimensional (2D) space using route-generating methods, enabling users to navigate the scenic routes with the scenic views corresponding to the virtual environment. The method includes receiving input data from an input data source. The input data includes at least one media content image with one or more points of interest (POIs), and a user preference including a desired length of a scenic route to be generated or a maximum number of bisectors. The method includes determining, using a condition, one or more scenic points in the at least one media content image based on the coordinates of the one or more POIs. The condition includes each scenic point of the one or more scenic points that is equidistant from a first point and a second point of a pair of first-second points. Each pair of first-second points is randomly selected from the one or more POIs. The random selection of first-second pairs is iteratively performed until the desired length. The method includes generating a plurality of scenic paths for each scenic point by forming lines between the first point and the second point and determining bisectors of each line. The method includes generating a scenic graph by (i) identifying intersection points in each scenic path where the scenic paths intersect with each other, (ii) identifying edges in the scenic path by plotting lines between consecutive intersection points in each scenic path, and (iii) generating the scenic graph using the edges and the intersection points. The method includes generating the scenic route with the scenic views corresponding to the virtual environment by applying at least one of route-generating method on the scenic graph based on the user preference and a set of route-generating conditions to enable the users to navigate the scenic routes with the scenic views corresponding to the virtual environment.

In some embodiments, the set of route-generating conditions includes at least one of (i) a route including only scenic paths and no non-scenic paths, (ii) the route includes a large number or all viewable pairs of points, (iii) the route includes a minimum number of scenic edges, (iv) the route includes a minimum number of repeated scenic edges. In some embodiments, the method includes generating the scenic route using the at least one of route-generating method including a min-max hull method that selects a subset of the intersection points, and connecting the selected subset of intersection points. In some embodiments, the method further includes comparing a total length of the convex hull on the scenic graph with a maximum allowable distance for the scenic routes to be generated.

In some embodiments, the method includes generating the scenic route using at least one of route-generating method including a densest line model. The densest line model (i) receives the bisectors (i.e. the maximum number of bisectors) of each scenic path (ii) categorizes the bisectors of each scenic path in a decreasing order based on a count of the intersection points on each bisector, (iii) selects top bisectors with a high number of intersection points in the categorized bisectors (iv) calculates furthest intersection points for the top bisectors with a high number of intersection points, (v) generates an alpha shape using the calculated furthest intersection points to connect the furthest intersection points, (vi) combines every two consecutive intersection points in the sequence of the furthest intersection points using a shortest path generating algorithm.

In some embodiments, the method includes optimizing the scenic graph by removing distant intersection points from the one or more intersection points by generating a bounding box around the one or more POIs. The distant intersection points are determined by identifying intersection points that remain beyond the bounding box and categorizing the identified intersection points as the distant intersection points.

In some embodiments, the method further includes generating the scenic route by (i) initializing viable points associated with the intersection points as an empty set, (ii) performing, by the min-max hull method, a min-max function on the scenic path to add new intersection points to the viable points, and (iii) generating the convex hull of new intersection points to determine the sequence of intersection points.

In one aspect, embodiments herein provide a system for generating scenic routes with scenic views corresponding to a virtual environment in a two-dimensional (2D) space using route-generating methods, enabling users to navigate the scenic routes with the scenic views corresponding to the virtual environment. The system includes a scenic route-finding unit. The scenic route-finding unit is configured to connect with an input data source through a network. The scenic route-finding unit includes a memory and a processor. The memory stores a set of instructions. The processor is configured to execute the set of instructions and the processor is configured to receive input data from the input data source. The input data includes at least one media content image with one or more points of interest (POIs), and a user preference including a desired length of a scenic route to be generated or a maximum number of bisectors. The processor is configured to determine, using a condition, one or more scenic points in the at least one media content image based on the coordinates of the one or more POIs. The condition includes each scenic point of the one or more scenic points that is equidistant from a first point and a second point of a pair of first-second points. Each pair of first-second points is randomly selected from the one or more POIs. The random selection of first-second pairs is iteratively performed until the desired length. The processor is configured to generate one or more scenic paths for each scenic point by forming lines between the first point and the second point, and determining bisectors of each line. The processor is configured to generate a scenic graph by (i) identifying intersection points in each scenic path where the scenic paths intersect with each other, (ii) identifying edges in the scenic path by plotting lines between consecutive intersection points in each scenic path, and (iii) generating the scenic graph using the edges and the intersection points. The processor is configured to generate the scenic route with the scenic views corresponding to the virtual environment by applying the at least one of route-generating method on the scenic graph based on the user preference and a set of route-generating conditions to enable the users to navigate the scenic routes with the scenic views corresponding to the virtual environment.

In some embodiments, the set of route-generating conditions includes at least one of (i) a route including only scenic paths and no non-scenic paths, (ii) the route includes a large number or all viewable pairs of points, (iii) the route includes a minimum number of scenic edges, (iv) the route includes a minimum number of repeated scenic edges. In some embodiments, the processor generates the scenic route using at least one of route-generating method including a min-max hull method that selects a subset of the intersection points, and connecting the selected subset of intersection points. In some embodiments, the processor compares a total length of the convex hull on the scenic graph with a maximum allowable distance for the scenic routes to be generated.

In some embodiments, the processor generates the scenic route using at least one of route-generating method including a densest line model. The densest line model (i) receives the bisectors (i.e. the maximum number of bisectors) of each scenic path (ii) categorizes the bisectors of each scenic path in a decreasing order based on a count of the intersection points on each bisector, (iii) selects top bisectors with a high number of intersection points in the categorized bisectors (iv) calculates furthest intersection points for the top bisectors with a high number of intersection points, (v) generates an alpha shape using the calculated furthest intersection points to connect the furthest intersection points, (vi) combines every two consecutive intersection points in the sequence of the furthest intersection points using a shortest path generating algorithm.

In some embodiments, the processor optimizes the scenic graph by removing distant intersection points from the one or more intersection points by generating a bounding box around the one or more POIs. The distant intersection points are determined by identifying intersection points that remain beyond the bounding box and categorizing the identified intersection points as the distant intersection points.

In some embodiments, the processor generates the scenic route by (i) initializing viable points associated with the intersection points as an empty set, (ii) performing, by the min-max hull method, a min-max function on the scenic path to add new intersection points to the viable points, and (iii) generating the convex hull of new intersection points to determine the sequence of intersection points.

In another aspect, there is provided one or more non-transitory computer-readable storage mediums storing one or more sequences of instructions, which when executed by one or more processors, causes a method for generating scenic routes with scenic views corresponding to a virtual environment in a two-dimensional (2D) space using route-generating methods, enabling users to navigate the scenic routes with the scenic views corresponding to the virtual environment. The one or more non-transitory computer-readable storage mediums performing steps of (i) receiving input data from an input data source, wherein the input data includes at least one media content image with one or more points of interest (POIs), and a user preference including a desired length of a scenic route to be generated or a maximum number of bisectors; (ii) determining, using a condition, one or more scenic points in the at least one media content image based on the coordinates of the plurality of POIs, wherein the condition includes each scenic point of the one or more scenic points that is equidistant from a first point and a second point of a pair of first-second points, wherein each pair of first-second points is randomly selected from the plurality of POIs, wherein the random selection of first-second pairs is iteratively performed until the desired length; (iii) generating one or more scenic paths for each scenic point by forming lines between the first point and the second point, and determining bisectors of each line; (iv) generating a scenic graph by (a) identifying intersection points in each scenic path where the scenic paths intersect with each other, (b) identifying edges in the scenic path by plotting lines between consecutive intersection points in each scenic path, and (c) generating the scenic graph using the edges and the intersection points; and (v) generating the scenic route with the scenic views corresponding to the virtual environment by applying the at least one of route-generating method on the scenic graph based on the user preference and a set of route-generating conditions to enable the users to navigate the scenic routes with the scenic views corresponding to the virtual environment.

In some embodiments, the set of route-generating conditions includes at least one of (i) a route including only scenic paths and no non-scenic paths, (ii) the route includes a large number or all viewable pairs of points, (iii) the route includes a minimum number of scenic edges, (iv) the route includes a minimum number of repeated scenic edges.

In some embodiments, the method includes generating the scenic route using at least one of route-generating method including a min-max hull method that selects a subset of the intersection points, and connecting the selected subset of intersection points.

In some embodiments, the method includes generating the scenic route using at least one of route-generating method including a densest line model. The densest line model (i) receives the bisectors (i.e. the maximum number of bisectors) of each scenic path (ii) categorizes the bisectors of each scenic path in a decreasing order based on a count of the intersection points on each bisector, (iii) selects top bisectors with a high number of intersection points in the categorized bisectors (iv) calculates furthest intersection points for the top bisectors with a high number of intersection points, (v) generates an alpha shape using the calculated furthest intersection points to connect the furthest intersection points, (vi) combines every two consecutive intersection points in the sequence of the furthest intersection points using a shortest path generating algorithm.

In some embodiments, the method includes optimizing the scenic graph by removing distant intersection points from the one or more intersection points by generating a bounding box around the one or more POIs. The distant intersection points are determined by identifying intersection points that remain beyond the bounding box and categorizing the identified intersection points as the distant intersection points.

In some embodiments, the method further includes generating the scenic route by (i) initializing viable points associated with the intersection points as an empty set, (ii) performing, by the min-max hull method, a min-max function on the scenic path to add new intersection points to the viable points, and (iii) generating the convex hull of new intersection points to determine the sequence of intersection points.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF THE DRAWINGS

Figure 1:
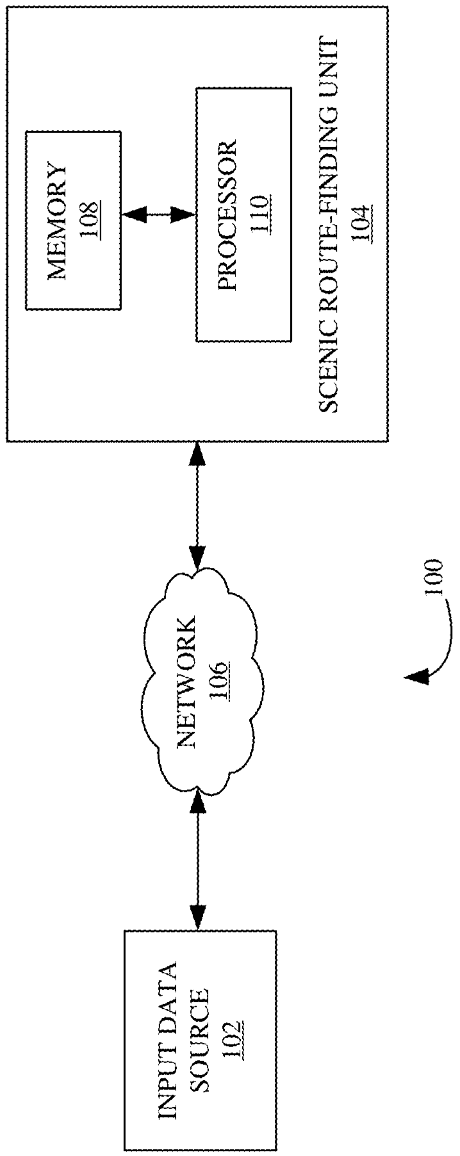
FIG. 1 illustrates a block diagram of a system for generating scenic routes with scenic views corresponding to a virtual environment in a two-dimensional (2D) space using route-generating methods, enabling users to navigate the scenic routes with the scenic views corresponding to the virtual environment according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there is a need for a system and a method for generating scenic routes with scenic views corresponding to a virtual environment in a two-dimensional (2D) space using route-generating methods, enabling users to navigate the scenic routes with the scenic views corresponding to the virtual environment. Referring now to the drawings, and more particularly to FIGS. 1 through 5, where similar reference characters denote corresponding features consistently throughout the figures, preferred embodiments are shown.

FIG. 1 illustrates a block diagram of a system 100 for generating scenic routes with scenic views corresponding to a virtual environment in a two-dimensional (2D) space using route-generating methods, enabling users to navigate the scenic routes with the scenic views corresponding to the virtual environment according to some embodiments herein. The system 100 includes an input data source 102, a scenic route-finding unit 104, and a network 106. The scenic route-finding unit 104 includes a memory 108 and a processor 110. The memory 108 stores a set of instructions. The processor 110 is configured to execute the set of instructions. The scenic route-finding unit 104 may be a handheld device, a mobile phone, a kindle, a Personal Digital Assistant (PDA), a tablet, a music player, a computer, a laptop, an electronic notebook or a Smartphone. The scenic route-finding unit 104 is configured to connect with the input data source 102 through the network 106. The network 106 is a wireless network or wired network. The network 106 may be a combination of a wired network and a wireless network. In some embodiments, network 106 is the Internet.

The scenic route-finding unit 104 is configured to receive input data from the input data source 102 using the processor 110. The input data may include one or more media contents with one or more points of interest (POIs). The input data may be with coordinates of the one or more POIs. The one or more media contents may be images with scenic places, city road images, Google map images, or any related images. The one or more points of interest may be a location that has a special or particular interest or a useful site. POIs may be tourist attractions, cultural, architectural, or recreational sites, scenic spots, or site of historical or archaeological interest. The input data source 102 may be personal devices including, but not limited to, a handheld device, a mobile phone, a Kindle, a Personal Digital Assistant (PDA), a tablet, a music player, a computer, a laptop, an electronic notebook or a Smartphone; websites; media platforms; or any online databases. The scenic route-finding unit 104 further receives a user preference on a desired length of a scenic route to be generated through the input data source 102.

The scenic route-finding unit 104 is configured to define one or more scenic points in the 2D space in the input data based on the coordinates of the one or more POIs using a condition. The scenic route-finding unit 104 may consider a set of first points and a set of second points in the input data. Each scenic point is defined from a pair of points (for example, a pair of first-second points) in the 2D space. That is, each scenic point is defined as a point that is equidistant to the first point and the second point in the pair of first-second points. Each of the scenic points is defined by its coordinates (x, y). Each of the scenic points provides a scenic view of the points of interest. The condition includes each scenic point of the one or more scenic points that is equidistant from a first point and a second point of a pair of first-second points and each pair of first-second points is randomly selected from the one or more POIs, and the random selection of the first-second pairs is iteratively performed until the desired length.

The scenic route-finding unit 104 generates one or more scenic paths for each scenic point by forming lines between the first point and the second point and determining the bisectors of each line. In some embodiments, a perpendicular bisector to the line joining the first point and the second point forms a scenic path between the first point and the second point. Each point on the bisector is a scenic point. Therefore, the entire bisector becomes a scenic path. The scenic path (or the bisector) is a path on which each point is a scenic point. Walking along such a path may provide a continuous scenic view.

The scenic route-finding unit 104 further generates a scenic graph by identifying one or more intersection points where the bisectors of each line (i.e. scenic paths) intersect and creating the scenic graph using the bisectors and one or more intersection points. That is, the scenic graph is created by partitioning each scenic path (or bisector) into scenic edges through its intersection point with other scenic paths (other bisectors). Accordingly, the one or more intersection points are nodes of the scenic graph and the bisectors or the scenic paths are edges of the scenic graph. Traversing anywhere on the scenic graph ensures a scenic view. However, to get a traversal that fits the set of route-generating conditions, the scenic route-finding unit 104 generates a scenic route.

The scenic route-finding unit 104 generates the scenic route by applying a route generating model on the scenic graph. The scenic route-finding unit 104 generates the scenic route in such a manner that the scenic route should satisfy a set of route-generating conditions. The set of route generating conditions may include (i) only scenic: a route comprising only scenic paths and no non-scenic (distracted) paths, (ii) completeness (the route includes a large number of all viewable pairs of points): traveling on the route must allow one to have a view of a large number of first-second pairs or all first-second pairs, (iii) minimal edges: a route must not have a large number of edges and there should not be a large number of direction changes within a route (the route includes a minimum number of scenic edges), and (iv) minimal repeated edges: a route must contain a minimal number of repeated edges, where the repeated edges are defined as stretches of paths that must be travelled more than once (repeated) to complete the entire route.

The route generating model to generate the scenic route may be at least one of (i) a first route generating model; or (ii) a second route generating model. The route generating model may be selected based on the specific kind of scenic route desired. In some embodiments, the first route generating model is a min-max hull model. The min-max hull method selects a subset of the intersection points, and connecting the selected subset of intersection points. In some embodiments, the second route generating model is a densest line model. In some embodiments, the scenic graph and the user preference for the desired length of the scenic route or a maximum number of bisectors are inputted into either one of the first route generating model or the second route generating model to generate the scenic route.

In some embodiments, the densest line model (i) receives the bisectors (i.e. a maximum number of bisectors K) of each scenic path (ii) categorizes the bisectors of each scenic path in a decreasing order based on a count of the intersection points on each bisector, (iii) selects top bisectors with a high number of intersection points in the categorized bisectors (iv) calculates furthest intersection points for the top bisectors with a high number of intersection points, (v) generates an alpha shape using the calculated furthest intersection points to connect the furthest intersection points, (vi) combines every two consecutive intersection points in the sequence of the furthest intersection points using a shortest path generating algorithm.

In some embodiments, the scenic route-finding unit 104 optimizes the scenic graph by removing distant intersection points from one or more intersection points by generating a bounding box around one or more POIs. The distant intersection points are determined by identifying intersection points that remain beyond the bounding box and categorizing the identified intersection points as the distant intersection points.

In some embodiments, the scenic route-finding unit 104 compares the total length of the convex hull on the scenic graph with a maximum allowable distance for the scenic routes to be generated. In some embodiments, the scenic route finding unit 104 generates the scenic route by (i) initializing viable points associated with the intersection points as an empty set, (ii) performing, by the min-max hull method, a min-max function on the scenic path to add new intersection points to the viable points, and (iii) generating the convex hull of new intersection points to determine the sequence of intersection points.

In some embodiments, the scenic route-finding unit 104 selects the scenic route that fulfils the set of route-generating conditions mentioned above. The scenic route-finding unit 104 may not prefer a route that satisfies fewer conditions, instead of all the set of route-generating conditions mentioned above. Thus, the scenic route is generated with scenic beauty being an equidistant view of points, thereby ensuring the balanced scenic views of the points of interest.

The system 100 generates a scenic route that satisfies a set of route-generating conditions and helps the user to traverse the 2D space conveniently. Further, traveling on this scenic route guarantees an equidistant view of points of interest, and provides the user with a balanced (or scenic) view of the points of interest. Since the route generating models of the system 100 (i.e., the first route generating model and the second route generating model) generate routes on the bisectors of lines joining first-second point pairs, all the routes generated are compulsorily scenic. Hence, the user has a scenic view during the travel over the scenic route. The route generating models fulfill the completeness requirement, if K (the number of dense bisectors in the second route generating model) and B (the distance bound in the first route generating model) are defined sufficiently large by the user. When K is the total number of bisectors or when B is ∞, the scenic route generated by the route generating models provides views of all the first-second point pairs. Hence, the user can able to view as many (preferably all) points of interest as possible.

In addition, since the route generated by the first route generating model includes only the convex hull, the scenic routes contain straight and long lines, leading to few direction changes. Hence, the user gets longer paths to not distract from the scenic beauty available. Moreover, the alpha shape hull applied in the second route generating model avoids higher chances of repeated edges. Hence, the user does not want to traverse the same path repeatedly. The system 100 avoids the repeated edges, as the repeated edges do not extend any additional novel views, instead unnecessarily increasing the total distance that needs to be traversed.

Further, the system 100 enables setting off an upper limit for the total length of route. This restricts route length and can be used to get a balance between the demand of a short trip and the demand of achieving maximum node coverage with fewer trips.

Figure 2:
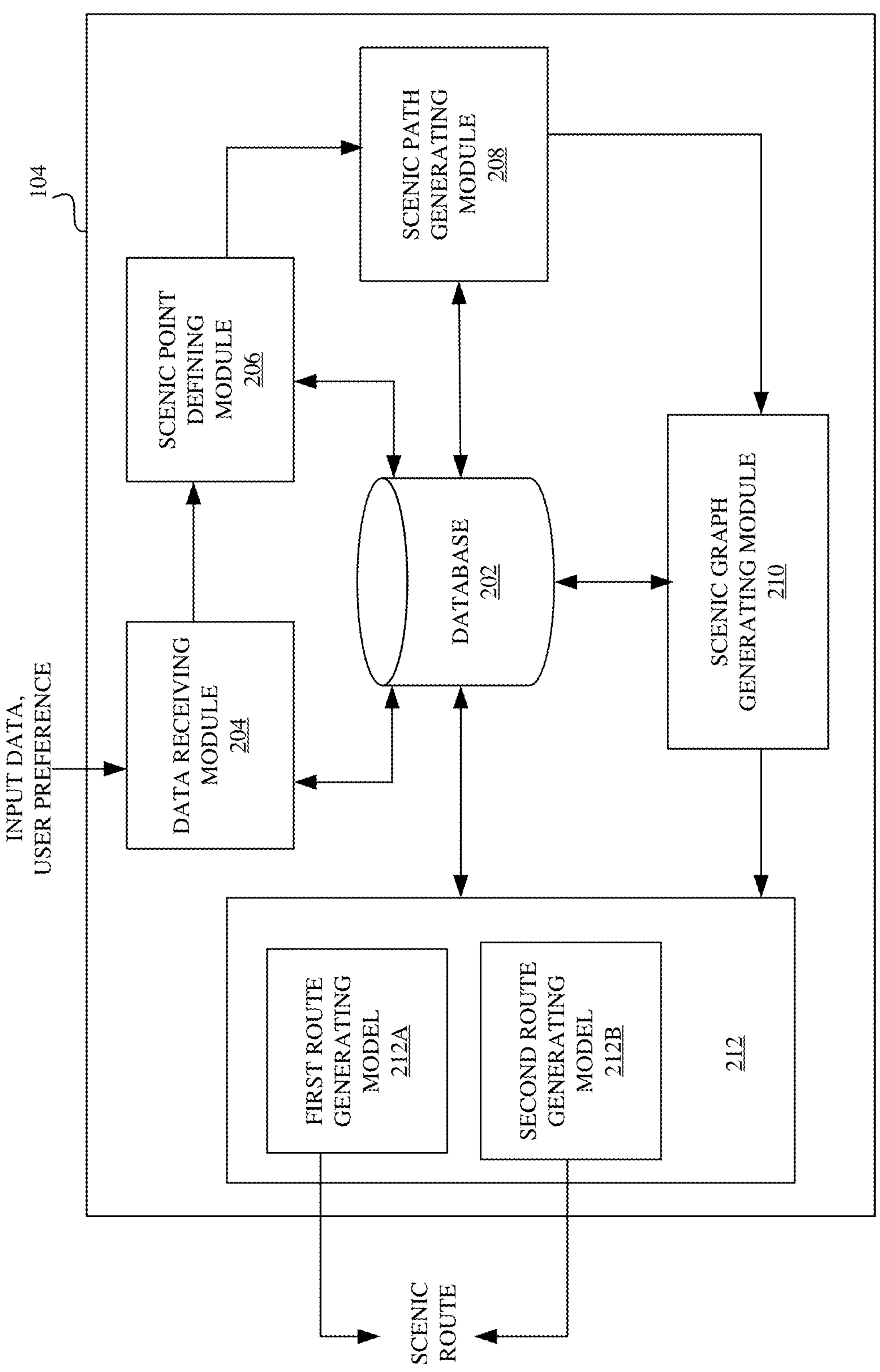
FIG. 2 illustrates an exploded view of a scenic route-finding unit of the system of FIG. 1 according to some embodiments herein.

FIG. 2 illustrates an exploded view of a scenic route-finding unit 104 of the system 100 of FIG. 1 according to some embodiments herein. The scenic route-finding unit 104 includes a database 202, a data receiving module 204, a scenic point defining module 206, a scenic path generating module 208, a scenic graph generating module 210, a scenic route generating module 212, a first graph generating model 212A, and a second graph generating model 212B.

The database 202 stores a set of modules of the scenic route-finding unit 104 that are executed by the processor 110 for generating a scenic route according to a set of route generating conditions. The data receiving module 204 receives input data from the input data source 102 through the network 106. The input data may include one or more media contents with one or more points of interest (POIs). The data receiving module 204 further receives a user preference on a desired length of a scenic route to be generated through the input data source 102.

The scenic point defining module 206 defines one or more scenic points in the 2D space in the input data based on the coordinates of the one or more points of interest (POIs) using a condition. The one or more scenic points may be a two-dimensional point. The scenic point defining module 206 may consider a set of first points (R), and a set of second points (B) in the input data and define one or more scenic points from a pair of points (for example, a pair of first-second points (R, B)) in the 2D space. That is, each scenic point (p) is defined as a point that is equidistant to the first point and the second point in the pair of first-second points. Each of the scenic points is defined by its coordinates (x, y) and provides a scenic view of the points of interest. The condition includes each scenic point of the one or more scenic points that is equidistant from a first point and a second point of a pair of first-second points and each pair of first-second points is randomly selected from the one or more POIs, and the random selection of the first-second pairs is iteratively performed until the desired length.

The scenic path generating module 208 is configured to generate one or more scenic paths for each scenic point, i.e., for each pair of the first-second point. The scenic path generating module 208 forms at least one line between the first point and the second point. The scenic path generating module 208 further determines bisector of each line by considering a midpoint of each line. In some embodiments, a perpendicular bisector to the line joining the first point and the second point forms a scenic path between the first point and the second point. Each point on the bisector is a scenic point. Therefore, the entire bisector becomes a scenic path. The scenic path (or the bisector) is a path on which each point is a scenic point.

The scenic graph generating module 210 generates a scenic graph by mapping one or more scenic paths into graphs. To generate the scenic graph, the scenic graph generating module 210 identifies one or more intersection points where the bisectors of each line (i.e. scenic paths) intersect. The scenic graph generating module 210 then creates the scenic graph using the bisectors and one or more intersection points. In some embodiments, the scenic graph generating module 210 creates the scenic graph by partitioning each scenic path (or bisector) into scenic edges through its intersection point with other scenic paths (other bisectors). Accordingly, the one or more intersection points are nodes of the scenic graph, and the bisectors or the scenic paths are edges of the scenic graph.

For example, the set of points where the bisectors intersect be $I_P$. The segments of the bisectors between the intersection points form the edge set $E_P$, which contributes to the edges of the scenic paths. The weight of each edge is the Cartesian distance between its endpoints. The scenic graph over all the intersection points is G ($I_P$, $E_P$). For a selected route; the set of points on a route is set as $S \subseteq I_P$, and the edges within the route is $E \subseteq E_P$. A scenic route is represented as a graph using the notation: G (S, E).

In some embodiments, the scenic graph generating module 210 removes distant intersection points from the set of $I_P$ by using a bounding box around the set of first and second points. The bounding box may not need to be a minimum bounding box and may be made larger or smaller by some quantity δ.

The scenic route generating module 212 generates a scenic route from the scenic graph G ($I_P$, $E_P$) that is generated by the scenic graph generating module 210 using a route generating model based on the set of route generating conditions. The route generating model may generate the scenic route by coupling the edges of the scenic graph G ($I_P$, $E_P$) satisfying the set of route generating conditions. The route generating model may be at least one of a first route generating model 212A or a second route generating model 212B. The route generating model may be selected based on the specific kind of scenic route desired. In some embodiments, the scenic graph G and the user preference on the desired length of the scenic route are inputted into at least one of the first route generating model 212A or a maximum number of bisectors is inputted to the second route generating model 212B to generate the scenic route.

In some embodiments, the scenic route generating module 214 applies the first route generating model 212A that selects the intersection points to be considered and connects the selected intersection points to create a closed scenic route. In some embodiments, the first route generating model 212A is a min-max hull model.

At initial, the first route generating model 212A considers x1, and x2 to be two points in the set IP that have the least distance between them. Then, S=[x1, x2]. An upper bound B may be kept on the total route distance to control the length of the routes generated.

The first route generating model 212A performs a first function (i.e. min-max function) to add a new suitable point into the current set of scenic route intersection points S. In detail, if S is the set of intersection points in a scenic route (initially Ø), the first route generating model 212A finds new intersection points x∈IP−S that are neither too close to S, nor too far away from S to add the new suitable intersection points into the current set of scenic route intersection points S. That is, if the first route generating model 212A selects the intersection points that are too close to S, it ends up with cluttered routes and fails to satisfy the route generating condition associated with minimal edges. If the first route generating model 212A selects the intersection points that are too far from S, it ends up with routes that go too far from the first-second points to get meaningful scenic views. Hence, the first route generating model 212A selects potential intersection points using the following formula:

$$x = \underset{x_i \in (I_P - S)}{\operatorname{argmin}}\left(\max_{a \in S}(d(x_i, a))\right)$$

where, d ($x_i$, a) is the all-pair shortest path distance between two nodes and S is the set of intersection points in the output scenic route.

The first route generating model 212A generates the convex hull of S and the sequence of intersection points given by the convex hull is A. If a bisector that connects two consecutive intersection points computed by the convex hull may not exist, a shortest path creating model is used to find the intermediary nodes (and the edges introduced by them) that connect the two intersection points. The shortest path creating model may be a Floyd-Warshall all-pairs shortest path algorithm (APSP). The length of the convex hull is calculated as the sum of the APSP distance between every two consecutive intersection points in the sequence Λ. If the length of the convex hull is smaller than the distance bound B, a new suitable point is added by performing the first function as described above, else, the scenic route is the convex hull of the set S. The first route generating model 212A repeatedly implements both the first function and the convex hull generation until the distance bound B is reached.

In some embodiments, the scenic route generating module 214 applies the second route generating model 212B on the scenic graph. The second route generating model 212B may be a densest line model. The second route generating model 212B ranks bisectors in the scenic graph in decreasing order of the number of intersection points and selects the top K bisectors from the above ranking. If each bisector L∈K, the intersection points x, y∈IP are the furthest intersection points among all intersection points in $I_P$ that lie on line L.

The second route generating model 212B calculates the furthest intersection points for all K bisectors, where the set of furthest points is F. The second route generating model 212B further generates an alpha shape of the set F and the sequence of intersection points given by the alpha shape is Λ. The second route generating model 212B connects every two consecutive intersection points in the sequence Λ using the shortest path creating model (APSP). The top K bisectors, alpha shape, and corresponding intersection points are the output scenic route. The intersection points on the shortest path required to connect two consecutive intersection points in A may not already exist in the set F. The output scenic route is long, straight, uninterrupted scenic paths which reduce directional changes and maximise the number of views.

In some embodiments, the scenic route is comprised of both the dense bisectors and the edges introduced as a result of the alpha-shaped hull. The user has a choice of whether to continue on the same dense line or shift to another dense line using the edges introduced due to the alpha shape. Moreover, the alpha shape hull avoids higher chances of repeated edges to satisfy the route generating condition associated with repeated edges.

Thus, the scenic route generating module 214 applies at least one of the first route generating model 212A or the second route generating model 212B and generates the scenic route in such a manner that the scenic route satisfies the set of route generating conditions.

Figure 3A:
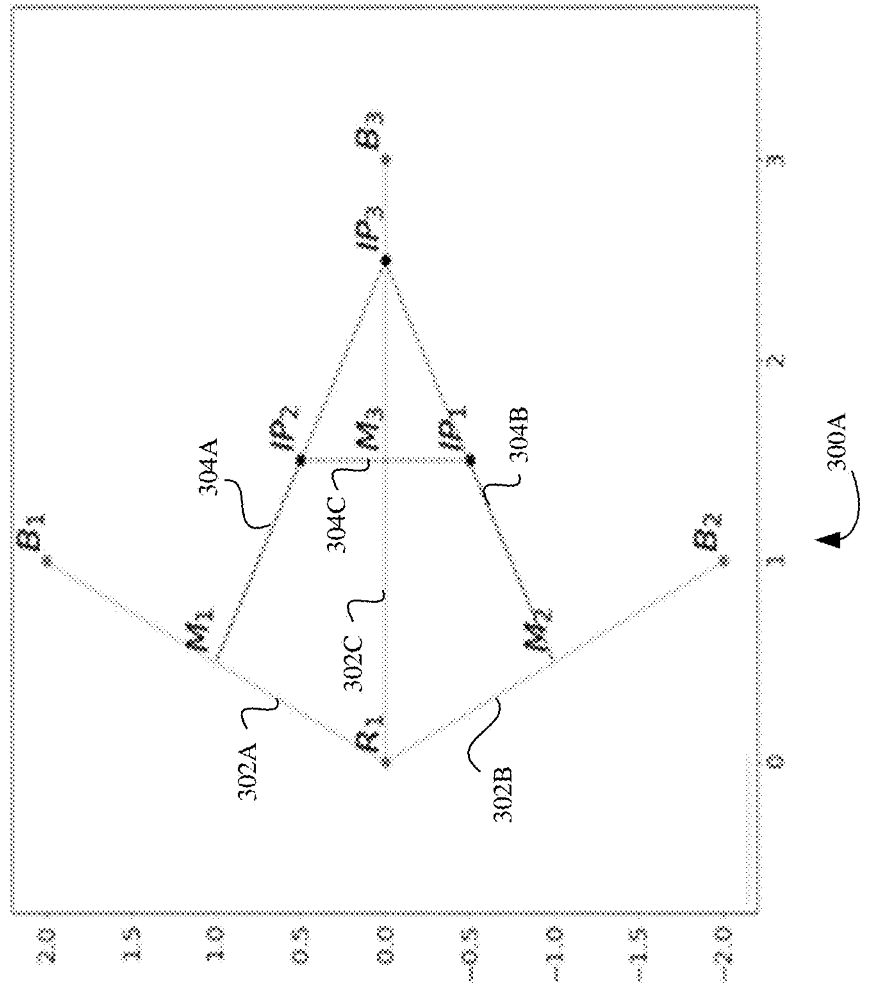
FIG. 3A is an exemplary diagram of a scenic graph that is generated by the scenic route-finding unit of FIG. 2 according to some embodiments herein.

FIG. 3A is an exemplary diagram of a scenic graph 300A that is generated by the scenic route-finding unit 104 of FIG. 2 according to some embodiments herein. In the graph 300A, R1 represents a first point, and B1, B2, and B3 represent a set of second points. M1, M2, and M3 represent the midpoints of the lines 302A, 302B, and 302C joining the first point (R1) and second points (B1, B2, B3) respectively. The numerals 304A, 304B, and 304C represent the perpendicular bisectors of the lines 302A, 302B, and 302C respectively. In the graph 300A, the lines 304A, 304B, and 304C are scenic paths.

The bisectors that intersect in a point is an intersection point ($I_P$). In the graph 300, $I_{P1}$, $I_{P2}$, and $I_{P3}$ are the intersection points of the perpendicular bisectors 304A, 304B, and 304C respectively. The segments of the bisectors between the intersection points form an edge set $E_P$. In the graph 300, $E_P=\{[I_{P1}, I_{P2}], [I_{P2}, I_{P3}], [I_{P3}, I_{P1}]\}$. The corresponding scenic graph is G ($I_P$, $E_P$). In some embodiments, the perpendicular bisectors are considered to generate the scenic route and to move from one bisector to another, the intersection points are used.

Figure 3B:
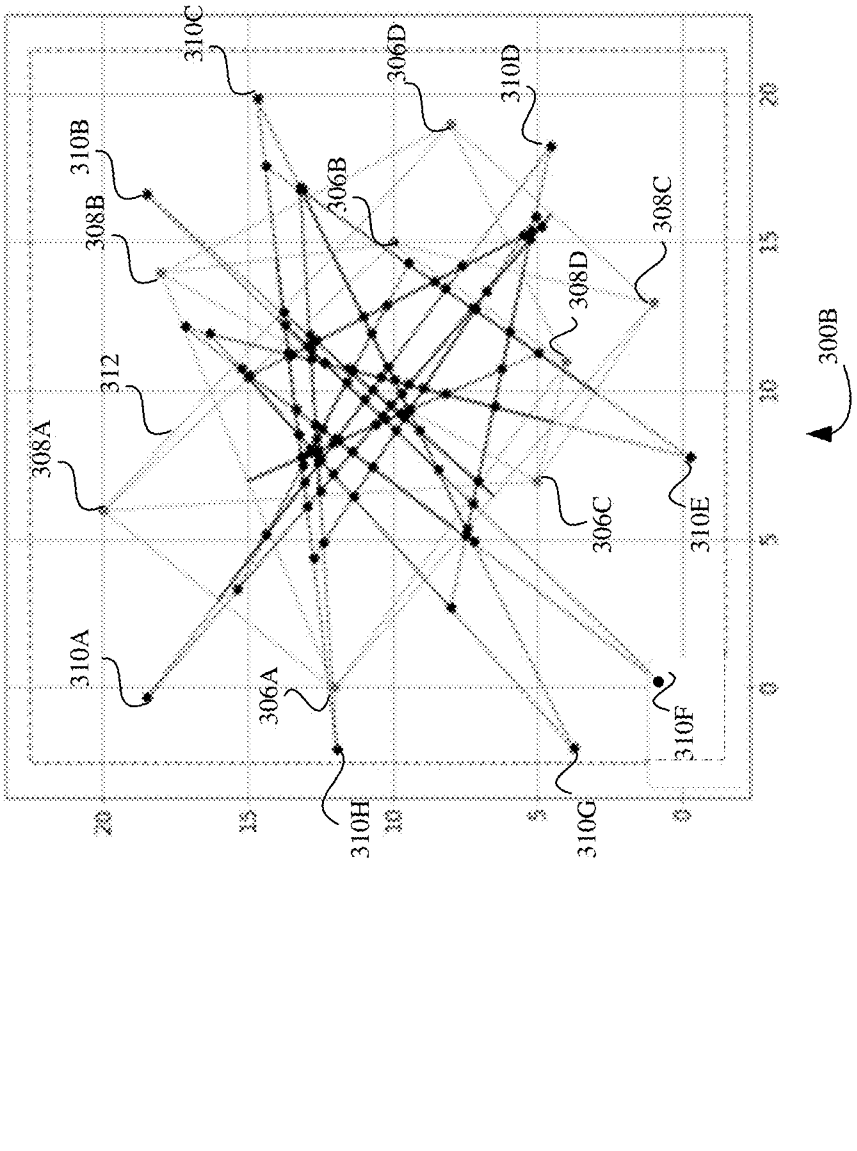
FIG. 3B is an exemplary diagram of a scenic graph that is generated by the scenic route-finding unit of FIG. 2 according to some embodiments herein.

FIG. 3B is an exemplary diagram of a scenic graph 300B that is generated by the scenic route-finding unit 104 of FIG. 2 according to some embodiments herein. In the scenic graph 300B, the points 306A, 306B, 306C, and 306D are the first points, and the points 308A, 308B, 308C, and 308D are the second points. In some embodiments, the s scenic route-finding unit 104 removes the distant intersection points from the set of $I_P$ by using a bounding box 312 around the set of first points (306A-D) and the set of second points (308A-D). The bounding box 312 may not need to be a minimum bounding box and may be made larger or smaller by some quantity δ.

Figure 4:
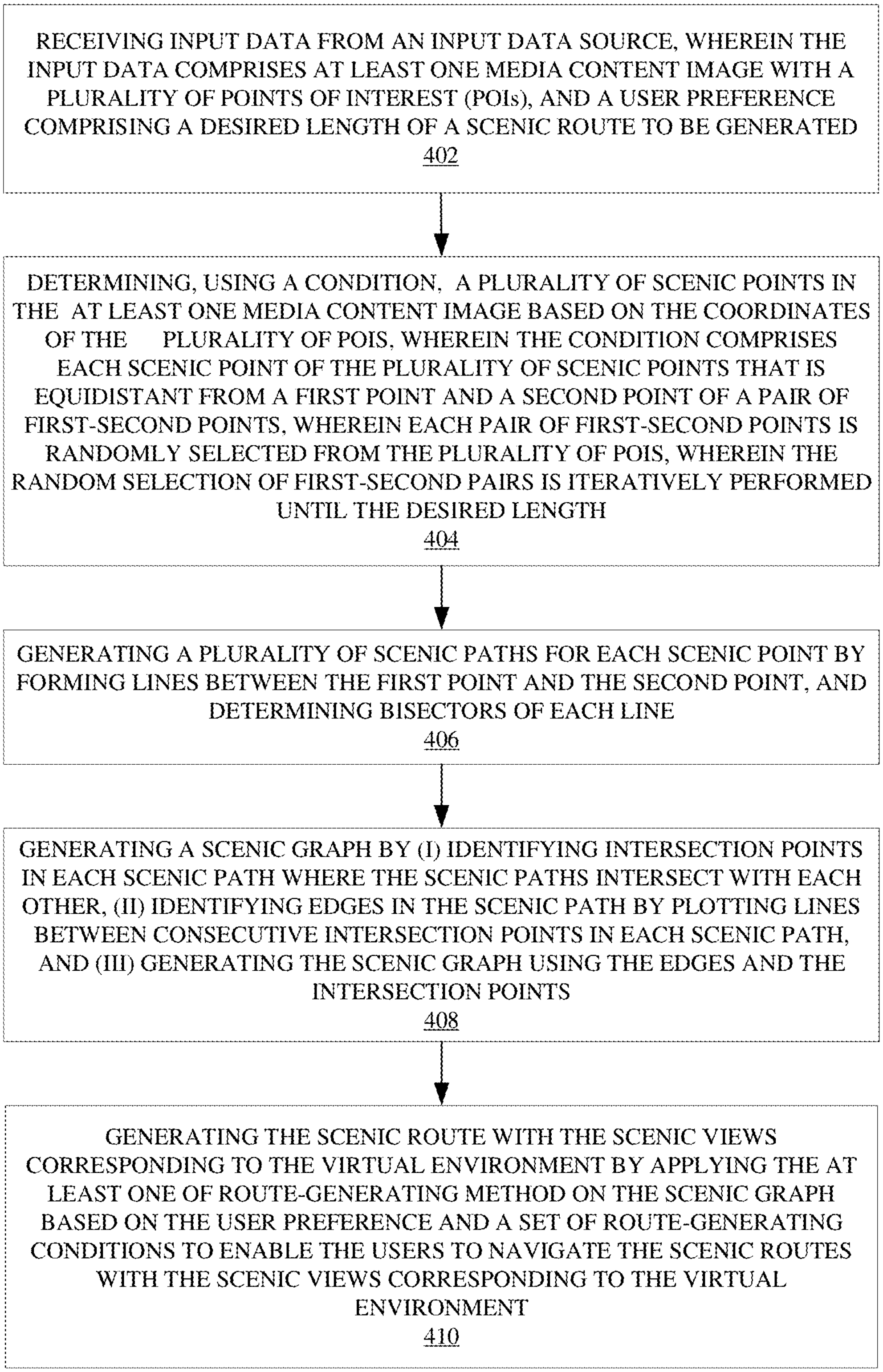
FIG. 4 is a flow diagram that illustrates a method for generating scenic routes with scenic views corresponding to a virtual environment in a two-dimensional (2D) space using route-generating methods, enabling users to navigate the scenic routes with the scenic views corresponding to the virtual environment according to some embodiments herein.

FIG. 4 is a flow diagram that illustrates a processor-implemented method for generating scenic routes with scenic views corresponding to a virtual environment in a two-dimensional (2D) space using route-generating methods, enabling users to navigate the scenic routes with the scenic views corresponding to the virtual environment according to some embodiments herein. At step 402, input data and a user preference are received from an input data source 102. The input data includes at least one media content image with one or more points of interest (POIs), and the user preference includes a desired length of a scenic route to be generated or a maximum number of bisectors. At step 404, one or more scenic points are determined in the at least one media content image based on the coordinates of the one or more POIs using a condition. The condition includes each scenic point of the one or more scenic points that is equidistant from a first point and a second point of a pair of first-second points. Each pair of first-second points is randomly selected from the one or more POIs, and the random selection of first-second pairs is iteratively performed until the desired length. At step 406, one or more scenic paths for each scenic point are generated by forming lines between the first point and the second point and determining bisectors of each line. In some embodiments, the perpendicular bisector to the line joining the first point and the second point form forms a scenic path between the first point and the second point.

At step 408, a scenic graph is generated by (i) identifying intersection points in each scenic path where the scenic paths intersect with each other, (ii) identifying edges in the scenic path by plotting lines between consecutive intersection points in each scenic path, and (iii) generating the scenic graph using the edges and the intersection points. At step 410, a scenic route with the scenic views corresponding to the virtual environment is generated by applying the at least one route-generating method on the scenic graph based on the user preference and a set of route-generating conditions to enable the users to navigate the scenic routes with the scenic views corresponding to the virtual environment.

In some embodiments, the set of route-generating conditions includes at least one of (i) a route including only scenic paths and no non-scenic paths, (ii) the route includes a large number of all viewable pairs of points, (iii) the route includes a minimum number of scenic edges, (iv) the route includes a minimum number of repeated scenic edges. In some embodiments, the method includes generating the scenic route using at least one route-generating method including a min-max hull method that selects a subset of the intersection points and connects the selected subset of intersection points. In some embodiments, the method further includes comparing a total length of the convex hull on the scenic graph with a maximum allowable distance for the scenic routes to be generated.

In some embodiments, the method includes generating the scenic route using at least one of the route-generating method including a densest line model. The densest line model (i) receives the bisectors (i.e. a maximum number of bisectors) of each scenic path and (ii) categorizes the bisectors of each scenic path in a decreasing order based on a count of the intersection points on each bisector, (iii) selects top bisectors with a high number of intersection points in the categorized bisectors (iv) calculates furthest intersection points for the top bisectors with a high number of intersection points, (v) generates an alpha shape using the calculated furthest intersection points to connect the furthest intersection points, (vi) combines every two consecutive intersection points in the sequence of the furthest intersection points using a shortest path generating algorithm.

In some embodiments, the method includes optimizing the scenic graph by removing distant intersection points from the one or more intersection points by generating a bounding box around the one or more POIs. The distant intersection points are determined by identifying intersection points that remain beyond the bounding box and categorizing the identified intersection points as the distant intersection points.

In some embodiments, the method further includes generating the scenic route by (i) initializing viable points associated with the intersection points as an empty set, (ii) performing, by the min-max hull method, a min-max function on the scenic path to add new intersection points to the viable points, and (iii) generating the convex hull of new intersection points to determine the sequence of intersection points.

Figure 5:
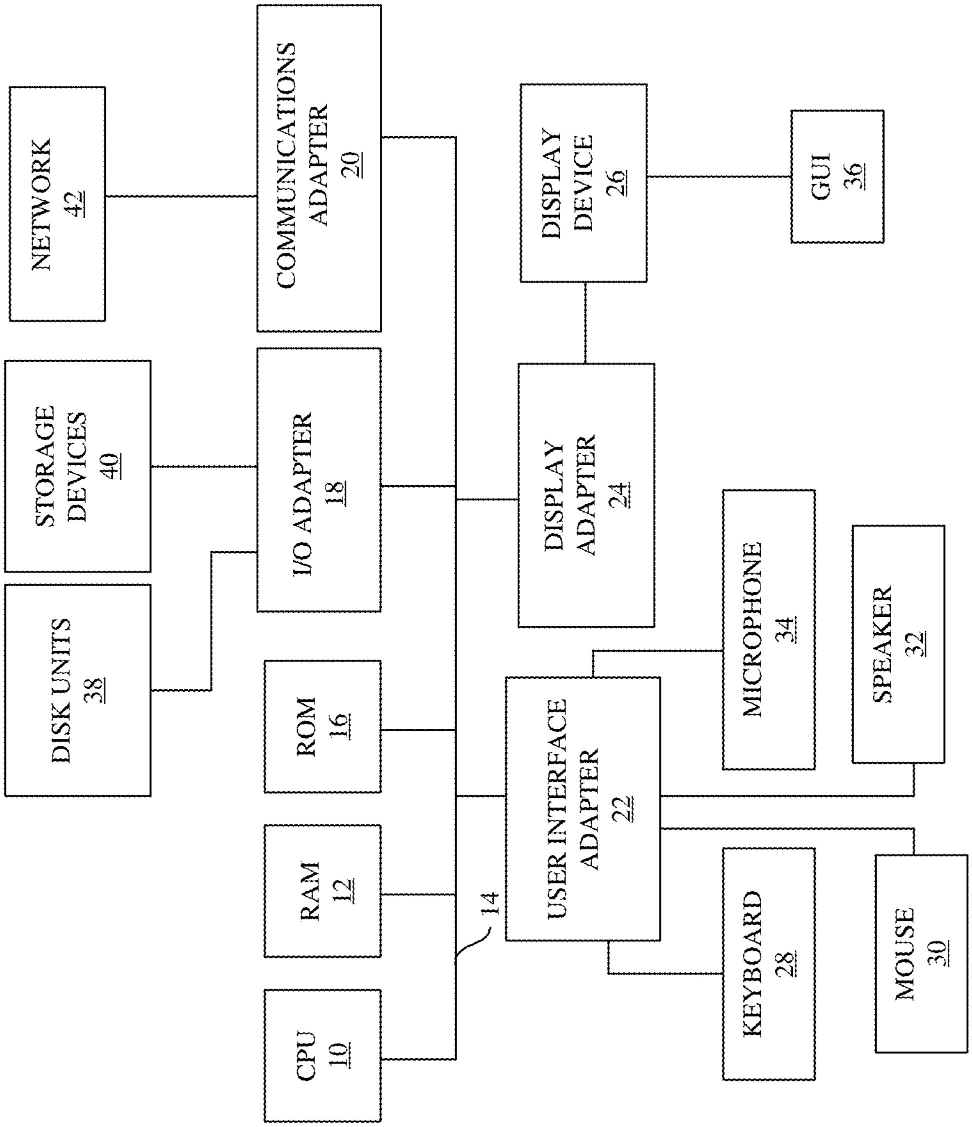
FIG. 5 is a schematic diagram of a computer architecture in accordance with the embodiments herein.

A representative hardware environment for practicing the embodiments herein is depicted in FIG. 5, with reference to FIGS. 1 through 4. This schematic drawing illustrates a hardware configuration of a scenic route-finding unit 104/computer system/computing device in accordance with the embodiments herein. The system includes at least one processing device CPU 10 that may be interconnected via system bus 15 to various devices such as a random-access memory (RAM) 12, read-only memory (ROM) 16, and an input/output (I/O) adapter 18. The I/O adapter 18 can connect to peripheral devices, such as disk unit 58 and program storage device 50 that are readable by the system. The system can read the inventive instructions on the program storage devices 50 and follow these instructions to execute the methodology of the embodiments herein. The system further includes a user interface adapter 22 that connects a keyboard 28, mouse 50, speaker 52, microphone 55, and/or other user interface devices such as a touch screen device (not shown) to the bus 15 to gather user preference. Additionally, a communication adapter 20 connects the bus 15 to a data processing network 52, and a display adapter 25 connects the bus 15 to a display device 26, which provides a graphical user interface (GUI) 56 of the output data in accordance with the embodiments herein, or which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope.

What is claimed is:

1. A processor-implemented method for generating and presenting scenic routes with scenic views in a virtual environment, wherein the method generates the scenic routes with the scenic views in a two-dimensional (2D) space corresponding to the virtual environment, and provides the scenic routes with the scenic views via a user interface to enable interactive navigation of the generated scenic routes, comprising:

receiving input data from an input data source, wherein the input data comprises at least one media content image with a plurality of points of interest (POIs), and a user preference comprising a desired length of a scenic route to be generated or a maximum number of bisectors;

executing a random selection operation to select each pair of points from the plurality of POIs, wherein the random selection of pairs is iteratively performed until the desired length is achieved;

determining, using a condition, a plurality of scenic points in the at least one media content image based on coordinates of the plurality of POIs, wherein the condition comprises each scenic point of the plurality of scenic points that is equidistant from a first point and a second point of a corresponding selected pair of points;

generating a plurality of scenic paths for each scenic point by forming a line between the first point and the second point, and determining a bisector of the line;

plotting (i) lines between consecutive intersection points from a plurality of intersection points in the plurality of scenic paths to identify edges in the plurality of scenic paths; (ii) optimizing a scenic graph by removing distant intersection points from the plurality of intersection points by generating a bounding box around the plurality of POIs, thereby reducing memory usage; and (iii) generating the scenic graph using identified edges and the consecutive intersection points; and executing a shortest path generating algorithm comprising an alpha shape technique or a convex hull technique to generate the scenic route with the scenic views corresponding to the virtual environment by applying at least one route-generating method on the scenic graph based on the user preference and a set of route-generating conditions to enable a user to navigate the scenic routes with the scenic views corresponding to the virtual environment.

2. The processor-implemented method of claim 1, wherein the set of route-generating conditions comprises at least one of (i) a route comprising only scenic paths and no non-scenic paths, (ii) the route comprises a large number or all viewable pairs of points, (iii) the route comprises a minimum number of scenic edges, (iv) the route comprises a minimum number of repeated scenic edges.

3. The processor-implemented method of claim 1, wherein the at least one route-generating method comprises a min-max hull method that selects a subset of the plurality of intersection points and connects the selected subset of intersection points.

4. The processor-implemented method of claim 1, wherein the method generates a convex hull from the plurality of intersection points in on the scenic graph and compares a total length of the convex hull on the scenic graph with a maximum allowable distance for the scenic routes to be generated.

5. The processor-implemented method of claim 1, wherein the at least one route-generating method comprises a densest line model, wherein the densest line model (1) receives the maximum number of bisectors of each scenic path (ii) categorizes the maximum number of bisectors of each scenic path in a decreasing order based on a count of the plurality of intersection points on each bisector, (iii) selects top bisectors with a high number of intersection points in the categorized bisectors (iv) calculates furthest intersection points for the top bisectors with the high number of intersection points, (v) generates the alpha shape using the calculated furthest intersection points to connect the furthest intersection points, (vi) combines every two consecutive intersection points in a sequence of the furthest intersection points using the shortest path generating algorithm.

6. The processor-implemented method of claim 1, wherein the distant intersection points are determined by identifying the plurality of intersection points that remain beyond the bounding box and categorizing identified intersection points as the distant intersection points.

7. The processor-implemented method of claim 1, wherein the method further comprises generating the scenic route by (i) initializing viable points associated with the plurality of intersection points as an empty set, (ii) performing, by a min-max hull method, a min-max function on the plurality of scenic paths to add new intersection points to the viable points, and (iii) generating the convex hull of the new intersection points to determine a sequence of intersection points.

8. A system for generating and presenting scenic routes with scenic views in a virtual environment, wherein the system generates the scenic routes with the scenic views in a two-dimensional (2D) space corresponding to the virtual environment, and provides the scenic routes with the scenic views via a user interface to enable interactive navigation of the generated scenic routes, comprising:

a scenic route-finding unit that is configured to connect with an input data source through a network, wherein the scenic route-finding unit comprises, a memory that stores a set of instructions; and a processor that is configured to execute the set of instructions and is configured to:

receive input data from an input data source, wherein the input data comprises at least one media content image with a plurality of points of interest (POIs), and a user preference comprising a desired length of a scenic route to be generated or a maximum number of bisectors;

execute a random selection operation to select each pair of points from the plurality of POIs, wherein the random selection of pairs is iteratively performed until the desired length is achieved;

determine, using a condition, a plurality of scenic points in the at least one media content image based on coordinates of the plurality of POIs, wherein the condition comprises each scenic point of the plurality of scenic points that is equidistant from a first point and a second point of a corresponding selected pair of points;

generate a plurality of scenic paths for each scenic point by forming a line between the first point and the second point, and determining a bisector of the line;

plot (i) lines between consecutive intersection points from a plurality of intersection points in the plurality of scenic paths to identify edges in the plurality of scenic paths; (ii) optimizing a scenic graph by removing distant intersection points from the plurality of intersection points by generating a bounding box around the plurality of POIs, thereby reducing memory usage; and (iii) generating the scenic graph using identified edges and the consecutive intersection points; and execute a shortest path generating algorithm comprising an alpha shape technique or a convex hull technique to generate the scenic route with the scenic views corresponding to the virtual environment by applying at least one route-generating method on the scenic graph based on the user preference and a set of route-generating conditions to enable a user to navigate the scenic routes with the scenic views corresponding to the virtual environment.

9. The system of claim 8, wherein the set of route-generating conditions comprises at least one of (i) a route comprising only scenic paths and no non-scenic paths, (ii) the route comprises a large number or all viewable pairs of points, (iii) the route comprises a minimum number of scenic edges, (iv) the route comprises a minimum number of repeated scenic edges.

10. The system of claim 8, wherein the processor performs a min-max hull method to select a subset of the plurality of intersection points and connecting the selected subset of intersection points.

11. The system of claim 8, wherein the processor generates a convex hull from the plurality of intersection points in the scenic graph and compares a total length of the convex hull on the scenic graph with a maximum allowable distance for the scenic routes to be generated.

12. The system of claim 8, wherein the processor executes a densest line model, wherein the densest line model (i) receives the maximum number of bisectors of each scenic path (ii) categorizes the maximum number of bisectors of each scenic path in a decreasing order based on a count of the plurality of intersection points on each bisector, (iii) selects top bisectors with a high number of intersection points in the categorized bisectors (iv) calculates furthest intersection points for the top bisectors with the high number of intersection points, (v) generates the alpha shape using the calculated furthest intersection points to connect the furthest intersection points, (vi) combines every two consecutive intersection points in a sequence of the furthest intersection points using the shortest path generating algorithm.

13. The system of claim 8, wherein the distant intersection points are determined by identifying the plurality of intersection points that remain beyond the bounding box and categorizing identified intersection points as the distant intersection points.

14. The system of claim 8, wherein the processor generates the scenic route by (i) initializing viable points associated with the plurality of intersection points as an empty set, (ii) performing, by a min-max hull method, a min-max function on the plurality of scenic paths to add new intersection points to the viable points, and (iii) generating the convex hull of the new intersection points to determine a sequence of intersection points.

15. One or more non-transitory computer-readable storage mediums storing one or more sequences of instructions, which when executed by one or more processors, causes a method for generating and presenting scenic routes with scenic views in a virtual environment, wherein the method generates the scenic routes with the scenic views in a two-dimensional (2D) space corresponding to the virtual environment, and provides the scenic routes with the scenic views via a user interface to enable interactive navigation of the generated scenic routes, performing steps of receiving input data from an input data source, wherein the input data comprises at least one media content image with a plurality of points of interest (POIs), and a user preference comprising a desired length of a scenic route to be generated or a maximum number of bisectors;

executing a random selection operation to select each pair of points from the plurality of POIs, wherein the random selection of pairs is iteratively performed until the desired length is achieved;

determining, using a condition, a plurality of scenic points in the at least one media content image based on coordinates of the plurality of POIs, wherein the condition comprises each scenic point of the plurality of scenic points that is equidistant from a first point and a second point of a corresponding selected pair of points;

generating a plurality of scenic paths for each scenic point by forming a line between the first point and the second point, and determining a bisector of the line;

plotting (i) lines between consecutive intersection points from a plurality of intersection points in the plurality of scenic paths to identify edges in the plurality of scenic paths; (ii) optimizing a scenic graph by removing distant intersection points from the plurality of intersection points by generating a bounding box around the plurality of POIs, thereby reducing memory usage; and (iii) generating the scenic graph using identified edges and the consecutive intersection points; and executing a shortest path generating algorithm comprising an alpha shape technique or a convex hull technique to generate the scenic route with the scenic views corresponding to the virtual environment by applying at least one route-generating method on the scenic graph based on the user preference and a set of route-generating conditions to enable a user to navigate the scenic routes with the scenic views corresponding to the virtual environment.

16. The one or more non-transitory computer-readable storage mediums of claim 15, wherein the set of route-generating conditions comprises at least one of (i) a route comprising only scenic paths and no non-scenic paths, (ii) the route comprises a large number or all viewable pairs of points, (iii) the route comprises a minimum number of scenic edges, (iv) the route comprises a minimum number of repeated scenic edges.

17. The one or more non-transitory computer-readable storage mediums of claim 15, wherein the at least one route-generating method comprises a min-max hull method that selects a subset of the plurality of intersection points and connecting the selected subset of intersection points.

18. The one or more non-transitory computer-readable storage mediums of claim 15, wherein the at least one route-generating method comprises a densest line model, wherein the densest line model (i) receives the maximum number of bisectors of each scenic path (ii) categorizes the maximum number of bisectors of each scenic path in a decreasing order based on a count of the plurality of intersection points on each bisector, (ii) selects top bisectors with a high number of intersection points in the categorized bisectors (iv) calculates furthest intersection points for the top bisectors with the high number of intersection points, (v) generates the alpha shape using the calculated furthest intersection points to connect the furthest intersection points, (vi) combines every two consecutive intersection points in a sequence of the furthest intersection points using the shortest path generating algorithm.

19. The one or more non-transitory computer-readable storage mediums of claim 15, wherein the distant intersection points are determined by identifying the plurality of intersection points that remain beyond the bounding box and categorizing identified intersection points as the distant intersection points.

20. The one or more non-transitory computer-readable storage mediums of claim 15, wherein the method further comprises generating the scenic route by (i) initializing viable points associated with the plurality of intersection points as an empty set, (ii) performing, by a min-max hull method, a min-max function on the plurality of scenic paths to add new intersection points to the viable points, and (iii) generating the convex hull of the new intersection points to determine a sequence of intersection points.

* * * * *